United States Patent
Wang et al.

(10) Patent No.: US 11,211,790 B2
(45) Date of Patent: Dec. 28, 2021

(54) T-TYPE DC CIRCUIT BREAKER AND METHOD FOR CONTROLLING THE SAME

(71) Applicant: Sichuan University, Chengdu (CN)

(72) Inventors: Shunliang Wang, Chengdu (CN); Ji Shu, Chengdu (CN); Tianqi Liu, Chengdu (CN); Junpeng Ma, Chengdu (CN); Hui Pang, Chengdu (CN); Zhiyuan He, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 16/929,113

(22) Filed: Jul. 15, 2020

(65) Prior Publication Data
US 2021/0336435 A1      Oct. 28, 2021

(30) Foreign Application Priority Data
Apr. 24, 2020   (CN) .......................... 202010332874.2

(51) Int. Cl.
*H02H 9/04*     (2006.01)
*H02H 3/22*     (2006.01)

(52) U.S. Cl.
CPC ............... *H02H 9/04* (2013.01); *H02H 3/22* (2013.01)

(58) Field of Classification Search
CPC .................................. H02H 9/04; H02H 3/22
USPC ................................................... 361/56, 93.7
See application file for complete search history.

(56) References Cited

U.S. PATENT DOCUMENTS

2014/0203847 A1*   7/2014   Hafner .................... H02H 3/05
                                                                327/109

* cited by examiner

*Primary Examiner* — Dharti H Patel
(74) *Attorney, Agent, or Firm* — Bayramoglu Law Offices LLC

(57) ABSTRACT

A T-type DC circuit breaker includes a main branch, a first commutation switch, a second commutation switch, and a bypass branch. The first commutation switch and the second commutation switch are arranged at both ends of the main branch, respectively. The bypass branch is connected in parallel with the main branch. The main branch includes at least one half-controlled power electronic component. The bypass branch includes a bypass capacitor and a bypass diode connected in series. Each of the first commutation switch and the second commutation switch includes at least one fully-controlled power electronic component. The first commutation switch is connected in parallel with a first surge arrester, and the second commutation switch is connected in parallel with a second surge arrester. The grounded branch is arranged between the main branch and the second commutation switch and is grounded or connected to the negative terminal of the load.

9 Claims, 2 Drawing Sheets

T-TYPE DC CIRCUIT BREAKER AND METHOD FOR CONTROLLING THE SAME

CROSS REFERENCE TO THE RELATED APPLICATIONS

This application is based upon and claims priority to Chinese Patent Application No. 202010332874.2, filed on Apr. 24, 2020, the entire contents of which are incorporated herein by reference.

TECHNICAL FIELD

The present invention belongs to the field of manufacture of direct current (DC) circuit breakers, and more particularly, relates to a T-type DC circuit breaker and a method for controlling the T-type DC circuit breaker.

BACKGROUND

DC transmission systems, DC distribution systems, and DC microgrids are developing rapidly in various countries. DC circuit breakers are critical to protecting a DC system. Thus, the research and development of DC circuit breakers have become an important part of the advancement of DC systems. Unlike alternating current (AC), DC has no zero crossing point and sharply rises when a failure occurs. Therefore, compared with AC circuit breakers, DC circuit breakers have unprecedented application scenarios, causing great difficulty in designing the DC circuit breaker. Currently, an economical and fully commercialized solution to the DC circuit breaker has not emerged worldwide.

At present, the DC circuit breaker topologies proposed in various scientific research institutions around the world can be divided into three categories: mechanical circuit breakers, solid-state circuit breakers, and hybrid circuit breakers. (1) The mechanical circuit breaker is designed based on the concept of AC circuit breaker, interrupts the DC by opening the mechanical switch, and arc during the opening process will be extinguished by the oscillation of the inductor-capacitor circuit (LC circuit) during the interruption process. The operating principle thereof shows that the mechanical DC circuit breaker is difficult to quickly interrupt the DC. (2) The conceptual model of the hybrid DC circuit breaker was first proposed by Asea Brown Boveri Ltd. (ABB), and then the hybrid DC circuit breaker has been continuously improved by various scientific research institutions around the world. The basic idea thereof is to combine the low-loss advantages of mechanical switches with the advantages of fully-controlled power electronic components. During normal operation, the DC flows through the branch in which the mechanical switch is arranged. After the instruction from the control system is received to interrupt the current, the DC is transferred to the branch in which the fully-controlled power electronic component is arranged. After the mechanical switch is completely opened, the DC is interrupted by the fully-controlled power electronic component. The operating principle thereof shows that the interruption process of the hybrid DC circuit breaker is fully under control, but the speed of interrupting the DC is limited by the mechanical switch. Moreover, a large number of fully-controlled power electronic components are used to interrupt the DC, resulting in the high cost of the hybrid DC circuit breaker. (3) Solid-state DC circuit breakers include solid-state DC circuit breakers based on fully-controlled power electronic components and solid-state DC circuit breakers based on half-controlled power electronic components. The DC circuit breakers based on the fully-controlled power electronic components use the fully-controlled power electronic components to transmit the DC, and directly interrupt the DC by the fully-controlled power electronic components after receiving the instruction from the control system. The operating principle thereof shows the solid-state DC circuit breaker has the disadvantage of high conduction loss. Moreover, DC circuit breaker also requires a large number of fully-controlled power electronic components to interrupt the DC, and thus is expensive. The solid-state DC circuit breakers based on the half-controlled power electronic components are designed based on the half-controlled power electronic components, and therefore, have a lower loss and cost compared with the DC circuit breakers based on the fully-controlled power electronic components. The interruption process of the solid-state DC circuit breaker based on the half-controlled power electronic components, however, is not fully under control because the power electronic components it based on are half-controlled. The operating principle thereof shows that the solid-state DC circuit breakers based on the half-controlled power electronic components cannot effectively and fully control the DC interruption.

SUMMARY

In view of the shortcomings of various DC circuit breakers in the prior art, the present invention provides a T-type DC circuit breaker combining fully-controlled power electronic components and half-controlled power electronic components, which not only diminishes the loss and cost of the DC circuit breaker, but also ensures the complete controllability and rapidity of the current interruption process.

The present invention adopts the following technical solutions to achieve the above-mentioned objective of the present invention.

A T-type DC circuit breaker, includes:

a main branch, wherein the main branch is arranged in a DC circuit, one end of the main branch is connected to a DC power supply, and the other end of the main branch is connected to the load; and the main branch is configured to perform a turn-on action according to a control signal;

commutation switches, wherein the commutation switches include a first commutation switch and a second commutation switch, and the first commutation switch and the second commutation switch are arranged at both ends of the main branch, respectively; both the first commutation switch and the second commutation switch are controlled by the control signal to perform the turn-on action when conducting DC, and both the first commutation switch and the second commutation switch are controlled by the control signal to perform a turn-off action when interrupting the DC; and a bypass branch; wherein one end of the bypass branch is connected to the common end of the main branch and the first commutation switch, and the other end of the bypass branch is connected to the common end of the second commutation switch and the load; the bypass branch is charged by the DC power supply during the turn-off process of the T-type DC circuit breaker to generate a reverse voltage to forcibly turn off the main branch.

Further, the main branch includes at least one half-controlled power electronic component. The turn-on process of the half-controlled power electronic component is controlled, and the turn-off process of the half-controlled power electronic component is uncontrolled.

Further, each of the first commutation switch and the second commutation switch includes at least one fully-controlled power electronic component. The turn-on process and the turn-off process of the fully-controlled power electronic component are both controlled.

Further, the bypass branch includes a bypass capacitor and bypass diode connected in series. One end of the bypass capacitor is connected to the common end of the main branch and the first commutation switch, and the other end of the bypass capacitor is connected to the anode of the bypass diode. The cathode of the bypass diode is connected to the common end of the second commutation switch and the load.

Further, a grounded branch is arranged between the main branch and the second commutation switch. One end of the grounded branch is connected to the common end of the main branch and the second commutation switch, and the other end of the grounded branch is grounded or connected to the negative terminal of the load.

Further, the grounded branch includes a grounded resistor and a grounded capacitor connected in series. One end of the grounded resistor is connected to the common end of the main branch and the second commutation switch. The other end of the grounded resistor is connected to one end of the grounded capacitor. The other end of the grounded capacitor is grounded or connected to the negative terminal of the load.

Further, a first surge arrester is connected in parallel with the first commutation switch. The first surge arrester is configured to limit the maximum withstand voltage of the first commutation switch, and is triggered by the current of the power supply during the turn-off process of the T-type DC circuit breaker.

Further, a second surge arrester is connected in parallel with the second commutation switch. The second surge arrester is configured to limit the maximum withstand voltage of the second commutation switch, and is triggered by the current in the grounded branch during the turn-off process of the T-type DC circuit breaker.

Further, the maximum withstand voltage of the first commutation switch is equal to the protection voltage of the first surge arrester, and the maximum withstand voltage of the second commutation switch is equal to the protection voltage of the second surge arrester.

Based on the above-mentioned T-type DC circuit breaker, the present invention further provides a method for controlling the T-type DC circuit breaker, including the following steps:

S1, when a DC is transmitted, sending a turn-on signal to the first commutation switch, the main branch and the second commutation switch in the T-type DC circuit breaker to control the first commutation switch, the main branch and the second commutation switch to be turned on, so as to allow the DC to flow through the first commutation switch, the main branch, and the second commutation switch to form a current path;

S2, when the DC is interrupted, sending a turn-off signal to the first commutation switch and the second commutation switch in the T-type DC circuit breaker to control the first commutation switch and the second commutation switch to be turned off, so as to transfer the DC from the main branch to the bypass branch to charge the bypass capacitor in the bypass branch;

S3, the first surge arrester connected in parallel with the first commutation switch is triggered by a current of the power supply, and the second surge arrester connected in parallel with the second commutation switch is triggered by the current in the grounded branch;

S4, generating a reverse voltage in the main branch to forcibly turn off the main branch; and S5, when the voltage of the bypass capacitor in the bypass branch is greater than the rated voltage of the DC power supply, the current of the DC power supply will be blocked.

The present invention has the following advantages.

(1) In the present invention, the fully-controlled power electronic component and the half-controlled power electronic component are combined to obtain the advantages of low loss and low cost of the DC circuit breaker, and perfectly and fully control the interruption process of the DC circuit breaker.

(2) The DC circuit breaker is designed completely based on the power electronic components to realize the effective and rapid interruption process of the DC circuit breaker.

DETAILED DESCRIPTION OF THE EMBODIMENTS

The specific embodiments of the present invention will be described hereinafter to facilitate skilled artisans' understanding of the present invention. However, it should be noted that the present invention is not limited to the scope of the specific embodiments. For those having ordinary skill in the art, if various modifications are made within the spirit and scope of the appended claims of the present invention, then these modifications are obvious, and any invention obtained by using the conception of the present invention shall fall within the scope of protection of the present invention.

Embodiment 1

Figure 1:
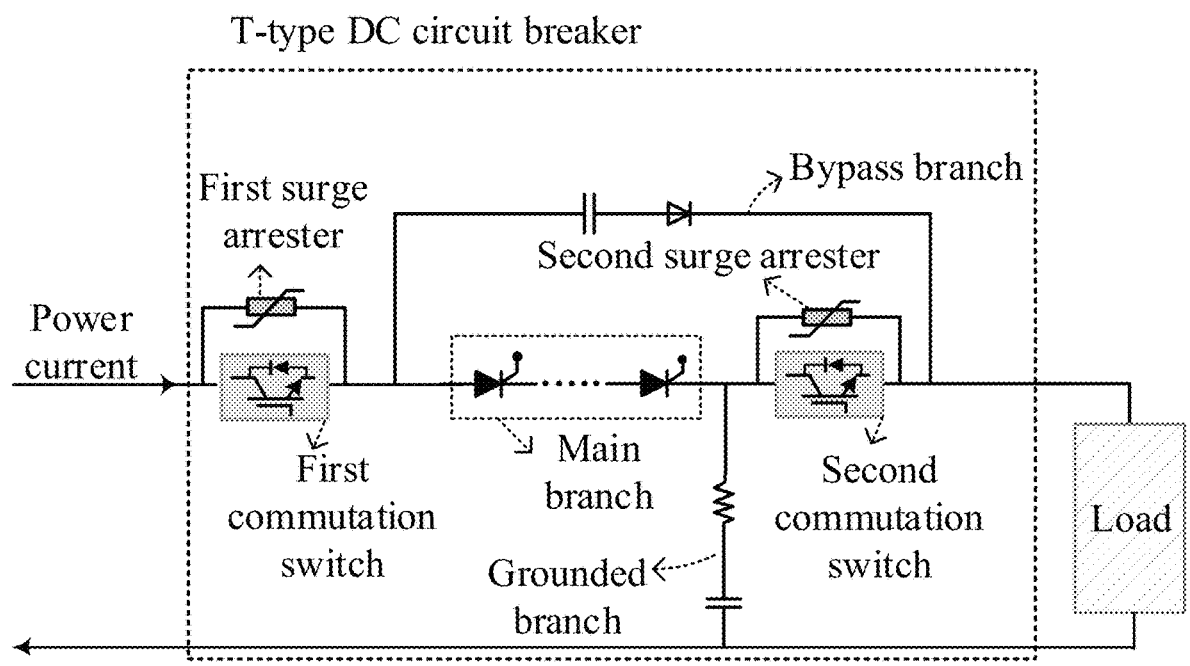
FIG. 1 is a schematic diagram showing the topology of the T-type DC circuit breaker of the present invention.

As shown in FIG. 1, the present embodiment provides a T-type DC circuit breaker, including a main branch, two commutation switches, and a bypass branch.

The main branch is arranged in the DC line. One end of the main branch is connected to the DC power supply, and the other end of the main branch is connected to the load. The main branch is configured to perform a turn-on action according to a control signal.

The two commutation switches include the first commutation switch and the second commutation switch that are arranged at both ends of the main branch, respectively. Both the first commutation switch and the second commutation switch are controlled by the control signal to perform the turn-on action when conducting DC, and both the first commutation switch and the second commutation switch are controlled by the control signal to perform the turn-off action when interrupting the DC.

One end of the bypass branch is connected to the common end of the main branch and the first commutation switch, and the other end of the bypass branch is connected to the common end of the second commutation switch and the load. The bypass branch is charged by the DC power supply during the turn-off process of the T-type DC circuit breaker to generate a reverse voltage to forcibly turn off the main branch.

In the present embodiment, the main branch includes at least one half-controlled power electronic component. Specifically, the main branch includes one half-controlled power electronic component, or a plurality of half-controlled power electronic components connected in series or parallel. The turn-on process of the half-controlled power electronic component is controlled, and the turn-off process of the half-controlled power electronic component is uncontrolled. The half-controlled power electronic component is a semiconductor material-based power electronic component, e.g., a silicon controlled rectifier (SCR).

The first commutation switch is controlled by the control signal to perform the turn-on and the turn-off action to control the turn-on and turn-off of the DC input of the power supply. The second commutation switch is controlled by the control signal to perform the turn-on and the turn-off action to control the turn-on and turn-off of the DC output of the power supply.

Each of the first commutation switch and the second commutation switch includes at least one fully-controlled power electronic component, and specifically includes one fully-controlled power electronic component, or a plurality of fully-controlled power electronic components connected in series or in parallel. The turn-on process and the turn-off process of the fully-controlled power electronic component are controlled. The fully-controlled power electronic component is a semiconductor material-based power electronic component, e.g., an insulated gate bipolar transistor (IGBT), an integrated gate-commutated thyristor (IGCT), an injection-enhanced gate transistor (IEGT), and others.

The bypass branch includes a bypass capacitor and a bypass diode that are connected in series. One end of the bypass capacitor is connected to one end of the main branch, that is, to the DC input end of the main branch. The other end of the bypass capacitor is connected to the anode of the bypass diode. The cathode of the bypass diode is connected to the other end of the main branch, that is, to the DC output end of the main branch.

Referring to FIG. 1, when no fault is detected, the DC circuit breaker actively turns on the operating current according to the control instruction of the DC system. The specific process thereof is as follows. The turn-on signal is sent to the first commutation switch, the main branch, and the second commutation switch via the DC system. The fully-controlled power electronic component and the half-controlled power electronic component are controlled to perform the turn-on action. At this time, the DC flows through the first commutation switch, the main branch, and the second commutation switch to form a current path to supply power to the load normally. When a fault is detected, the DC circuit breaker actively turns off the fault current according to the control instruction of the DC system. The specific process thereof is as follows. The turn-off signal is sent to the first commutation switch and the second commutation switch. The DC is transferred from the main branch to the bypass branch, and the bypass capacitor in the bypass branch is charged from zero voltage state. Since the initial voltage of the bypass capacitor in the bypass branch is zero, a reverse voltage is generated in the main branch to forcibly turn off the half-controlled power electronic component in the main branch. The DC continues to charge the bypass capacitor in the bypass branch until the DC is blocked.

In the present invention, the fully-controlled power electronic component and the half-controlled power electronic component are combined to not only obtain the advantages of low loss and low cost of the DC circuit breaker but also perfectly and fully control the interruption process of the DC circuit breaker. Moreover, the DC circuit breaker is designed completely based on the power electronic component to realize the effective and rapid interruption process of the DC circuit breaker.

Embodiment 2

The T-type DC circuit breaker in the present embodiment is substantially the same as that in Embodiment 1, and the differences between the present embodiment and Embodiment 1 are as follows. In the present embodiment, the grounded branch is arranged between the main branch and the second commutation switch. One end of the grounded branch is connected to the common end of the main branch and the second commutation switch. The other end of the grounded branch is grounded or connected to the negative terminal of the load. A first surge arrester is connected in parallel with the first commutation switch, and a second surge arrester is connected in parallel with the second commutation switch.

In the present embodiment, the grounded branch includes a grounded resistor and a grounded capacitor. One end of the grounded resistor is connected to the common end of the main branch and the first commutation switch. The other end of the grounded resistor is connected to one end of the grounded capacitor. The other end of the grounded capacitor is grounded or connected to the negative terminal of the load.

The first surge arrester is configured to limit the maximum withstand voltage of the first commutation switch, and the maximum withstand voltage of the first commutation switch is the protection voltage of the first surge arrester. The first surge arrester is further triggered by the current of the power supply during the turn-off process of the T-type DC circuit breaker.

The second surge arrester is configured to limit the maximum withstand voltage of the second commutation switch, and the maximum withstand voltage of the second commutation switch is the protection voltage of the second surge arrester. The second surge arrester is further triggered by the current in the grounded branch during the turn-off process of the T-type DC circuit breaker.

The trigger action process of the first surge arrester and the second surge arrester is as follows. The first surge arrester and the second surge arrester are charged by the DC power supply to cause a voltage rise, and the voltage ceases to rise when rising to the protection voltages of the first surge arrester and the second surge arrester, so as to limit the maximum withstand voltages of the first commutation switch and the second commutation switch. In this way, the first commutation switch and the second commutation switch are protected against damage caused by the transient overvoltage.

To realize the economy of the T-type DC circuit breaker, the use of fully-controlled power electronic components in the first commutation switch and the second commutation switch should be minimized. Therefore, in the present invention, the rated voltages of the fully-controlled power electronic components in the first commutation switch and the second commutation switch are greater than the protection voltages of the surge arresters, and the protection voltages of the first surge arrester and the second surge arrester are much lower than the rated voltage of the DC system.

Referring to FIG. 1, when no fault is detected, the DC circuit breaker actively turns on the operating current according to the control instruction of the DC system. The specific process thereof is as follows. The turn-on signal is sent to the first commutation switch, the main branch, and the second commutation switch. The fully-controlled power electronic component and the half-controlled power electronic component are controlled to perform the turn-on action. At this time, the DC flows through the first commutation switch, the main branch, and the second commutation switch to form a current path to supply power to the load normally. When a fault is detected, the DC circuit breaker actively turns off the fault current according to the control instruction of the DC system. The specific process thereof is as follows. The turn-off signal is sent to the first commutation switch and the second commutation switch. The DC is transferred from the main branch to the bypass branch. The bypass capacitor in the bypass branch is charged from the zero voltage state. The first surge arrester connected in parallel with the first commutation switch and the second surge arrester connected in parallel with the second commutation switch are triggered by the power supply current and the current in the grounded branch, respectively. The initial voltage of the bypass capacitor in the bypass branch is zero, the voltage of the first commutation switch is equal to the protection voltage of the first surge arrester connected in parallel with the first commutation switch, the voltage of the second commutation switch is equal to the protection voltage of the second surge arrester connected in parallel with the second commutation switch, and therefore, a reverse voltage is generated in the main branch to forcibly turn off the half-controlled power electronic component in the main branch. The power supply current continuously flows through the bypass capacitor in the bypass branch to cause a continuous rise in the voltage of the bypass capacitor in the bypass branch. When the voltage of the bypass capacitor is greater than the rated voltage of the DC power supply, the power supply current is blocked.

Embodiment 3

Figure 2:
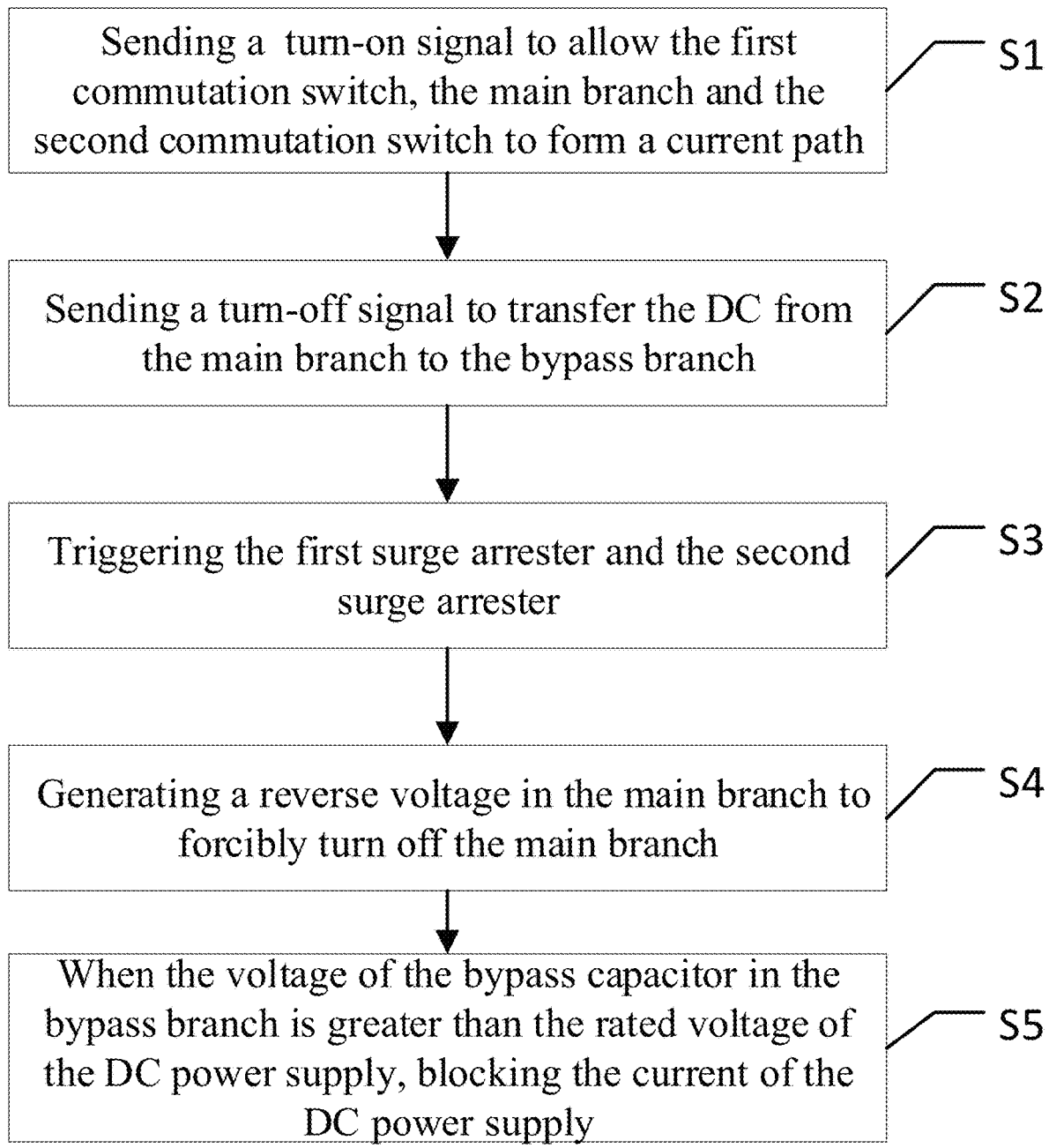
FIG. 2 is a flow chart of the method for controlling the T-type DC circuit breaker of the present invention.

Based on the above-mentioned T-type DC circuit breaker, the present embodiment provides a method for controlling the T-type DC circuit breaker, as shown in FIG. 2, including the following steps:

S1, when a DC is transmitted, a turn-on signal is sent to the first commutation switch, the main branch and the second commutation switch in the T-type DC circuit breaker to control the first commutation switch, the main branch and the second commutation switch to be turned on, so as to allow the DC to flow through the first commutation switch, the main branch, and the second commutation switch to form a current path.

S2, when the DC is interrupted, a turn-off signal is sent to the first commutation switch and the second commutation switch in the T-type DC circuit breaker to control the first commutation switch and the second commutation switch to be turned off, so as to transfer the DC from the main branch to the bypass branch to charge the bypass capacitor in the bypass branch from zero voltage state.

S3, the first surge arrester connected in parallel with the first commutation switch and the second surge arrester connected in parallel with the second commutation switch are triggered by the power supply current and the current in the grounded branch, respectively.

S4, since the initial voltage of the bypass capacitor in the bypass branch is zero, the voltage of the first commutation switch is equal to the protection voltage of the first surge arrester connected in parallel with the first commutation switch, and the voltage of the second commutation switch is equal to the protection voltage of the second surge arrester connected in parallel with the second commutation switch, a reverse voltage is generated in the main branch to forcibly turn off the half-controlled power electronic component in the main branch.

S5, the power supply current continuously flows through the bypass capacitor in the bypass branch to cause continuous rise in the voltage of the bypass capacitor in the bypass branch, when the voltage of the bypass capacitor is greater than the rated voltage of the DC power supply, the power supply current is blocked.

Those having ordinary skill in the art can realize that the embodiments described herein are intended to facilitate the readers' understanding of the principle of the present invention. It should be understood that the scope of protection of the present invention is not limited to such specific descriptions and embodiments. Those having ordinary skill in the art can make various specific modifications and combinations without departing from the essence of the present invention based on the teachings disclosed in the present invention, and these modifications and combinations shall fall within the scope of protection of the present invention.

What is claimed is:

1. A T-type DC circuit breaker, comprising: a main branch, commutation switches, and a bypass branch; wherein,
    the main branch is arranged in a DC circuit, a first end of the main branch is connected to a DC power supply, and a second end of the main branch is connected to a load; and the main branch is configured to perform a turn-on action according to a control signal;
    the commutation switches comprise a first commutation switch and a second commutation switch; the first commutation switch and the second commutation switch are arranged at both ends of the main branch, respectively; both the first commutation switch and the second commutation switch are controlled by the control signal to perform the turn-on action when conducting a DC, and both the first commutation switch and the second commutation switch are controlled by the control signal to perform a turn-off action when interrupting the DC, and
    a first end of the bypass branch is connected to a common end of the main branch and the first commutation switch, and a second end of the bypass branch is connected to a common end of the second commutation switch and the load; the bypass branch is charged by the DC power supply during a turn-off process of the T-type DC circuit breaker to generate a reverse voltage to forcibly turn off the main branch;
    wherein each of the first commutation switch and the second commutation switch comprises at least one fully-controlled power electronic component; a turn-on process and a turn-off process of the at least one fully-controlled power electronic component are both controlled.

2. The T-type DC circuit breaker according to claim 1, wherein, the main branch comprises at least one half-controlled power electronic component; a turn-on process of the at least one half-controlled power electronic component is controlled, and a turn-off process of the at least one half-controlled power electronic component is uncontrolled.

3. The T-type DC circuit breaker according to claim 1, wherein, the bypass branch comprises a bypass capacitor and a bypass diode, wherein the bypass capacitor and the bypass diode are connected in series; a first end of the bypass capacitor is connected to the common end of the main branch and the first commutation switch, and a second end of the bypass capacitor is connected to an anode of the bypass diode; a cathode of the bypass diode is connected to the common end of the second commutation switch and the load.

4. The T-type DC circuit breaker according to claim 1, wherein, a grounded branch is arranged between the main branch and the second commutation switch; a first end of the grounded branch is connected to a common end of the main branch and the second commutation switch, and a second end of the grounded branch is grounded or connected to a negative terminal of the load.

5. The T-type DC circuit breaker according to claim 4, wherein, the grounded branch comprises a grounded resistor and a grounded capacitor, wherein the grounded resistor and the grounded capacitor are connected in series; a first end of the grounded resistor is connected to the common end of the main branch and the second commutation switch; a second end of the grounded resistor is connected to a first end of the grounded capacitor, and a second end of the grounded capacitor is grounded or connected to the negative terminal of the load.

6. The T-type DC circuit breaker according to claim 5, wherein, a first surge arrester is connected in parallel with the first commutation switch; the first surge arrester is configured to limit a maximum withstand voltage of the first commutation switch, and the first surge arrester is triggered by a current of the DC power supply during the turn-off process of the T-type DC circuit breaker.

7. The T-type DC circuit breaker according to claim 6, wherein, a second surge arrester is connected in parallel with the second commutation switch; the second surge arrester is configured to limit a maximum withstand voltage of the second commutation switch, and the second surge arrester is triggered by a current in the grounded branch during the turn-off process of the T-type DC circuit breaker.

8. The T-type DC circuit breaker according to claim 7, wherein, the maximum withstand voltage of the first commutation switch is equal to a protection voltage of the first surge arrester, and the maximum withstand voltage of the second commutation switch is equal to a protection voltage of the second surge arrester.

9. A method for controlling a T-type DC circuit breaker, comprising the following steps:
- S1, when a DC is transmitted, sending a turn-on signal to a first commutation switch, a main branch and a second commutation switch in the T-type DC circuit breaker to turn on the first commutation switch, the main branch and the second commutation switch, wherein the DC flows through the first commutation switch, the main branch, and the second commutation switch to form a current path;
- S2, when the DC is interrupted, sending a turn-off signal to the first commutation switch and the second commutation switch in the T-type DC circuit breaker to turn off the first commutation switch and the second commutation switch, wherein the DC is transferred from the main branch to a bypass branch to charge a bypass capacitor in the bypass branch;
- S3, triggering a first surge arrester connected in parallel with the first commutation switch by a current of a DC power supply, and triggering a second surge arrester connected in parallel with the second commutation switch by a current in a grounded branch;
- S4, generating a reverse voltage in the main branch to forcibly turn off the main branch; and
- S5, when a voltage of the bypass capacitor in the bypass branch is greater than a rated voltage of the DC power supply, blocking the current of the DC power supply.

* * * * *